United States Patent [19]

Martin

[11] 3,878,263
[45] Apr. 15, 1975

[54] ACRYLATE-FUNCTIONAL POLYSILOXANE POLYMERS

[75] Inventor: Eugene Ray Martin, Onsted, Mich.

[73] Assignee: Stauffer Chemical Company, Westport, Conn.

[22] Filed: July 10, 1972

[21] Appl. No.: 270,139

[52] U.S. Cl. ..... 260/825; 260/46.5 UA; 260/46.5 R; 260/448.2 B; 260/448.2 Q; 260/448.8 R; 260/405.5; 260/827
[51] Int. Cl. ..... C08g 31/22; C08g 47/10; C07f 7/18
[58] Field of Search ............ 260/825, 827, 448.2 Q, 260/46.5 UA, 448.8 R, 448.2 B

[56] References Cited
UNITED STATES PATENTS

| | | | |
|---|---|---|---|
| 3,156,668 | 11/1964 | Pike | 260/824 R |
| 3,346,610 | 10/1967 | Omietanski et al. | 260/46.5 R |
| 3,417,161 | 12/1968 | Douds et al. | 260/825 |
| 3,542,585 | 11/1970 | Heit | 260/827 |
| 3,652,711 | 3/1972 | Triem | 260/825 |
| 3,779,987 | 12/1973 | Razzano | 260/825 |

FOREIGN PATENTS OR APPLICATIONS

| | | | |
|---|---|---|---|
| 1,099,619 | 1/1968 | United Kingdom | 260/825 |

Primary Examiner—Wilbert J. Briggs, Sr.

[57] ABSTRACT

The invention relates to novel acrylate and substituted acrylate-functional polysiloxane polymers of the general formula

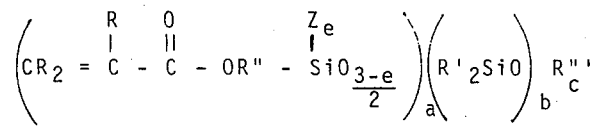

in which the R(s) may be the same or different and represent hydrogen or monovalent hydrocarbon radicals having from one to 12 carbon atoms, R' is a monovalent hydrocarbon radical, a halogenated monovalent hydrocarbon radical or a cyanoalkyl radical having from one to 18 carbon atoms, R'' is a divalent hydrocarbon radical having from one to 18 carbon atoms or the corresponding divalent hydrocarbon radical having C — O — C linkages, R''' is a radical selected from the class consisting of R''''$O_{0.5}$ and R'$_3$Si-$O_{0.5}$, Z is a group selected from the class consisting of OR'''', R''''or OSiR'$_3$ in which R'''' is hydrogen or a monovalent hydrocarbon radical, $a$ and $b$ are each numbers of from 1 to 20,000, $c$ is a number of from 0 to 3 and $e$ is a number of from 0 to 2 and when $c$ is equal to 0, then at least one Z must be OR''''. These polysiloxane polymers may be used as reactive intermediates for preparing copolymers, as sizing agents and as protective coatings.

5 Claims, No Drawings

ACRYLATE-FUNCTIONAL POLYSILOXANE POLYMERS

This invention relates to organopolysiloxane compositions and more particularly to acrylate and substituted acrylate-functional polysiloxane polymers and to a method for preparing the same. These acrylate-functional organopolysiloxane polymers which consist of linear, branched or cyclic polymers may be represented by the general formula

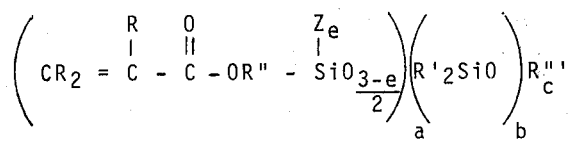

in which the R(s) may be the same or different and represent hydrogen or monovalent hydrocarbon radicals having from one to 12 carbon atoms, R' is a monovalent hydrocarbon radical, a halogenated monovalent hydrocarbon radical or a cyanoalkyl radical having from one to 18 carbon atoms, R'' is a divalent alkylene or arylene radical having from one to 18 carbon atoms, a divalent alkenyl radical having from two to 18 carbon atoms or an oxyalkylene radical containing C — O — C linkages, R''' is a radical selected from the class consisting of R''''$O_{0.5}$ and R'$_3$SiO$_{0.5}$. Z is a group selected from the class consisting of OR'''', R'''' or OSiR'$_3$ in which R'''' is hydrogen or a monovalent hydrocarbon radical, $a$ and $b$ are each numbers of from 1 to 20,000, $c$ is a number of from 0 to 3 and $e$ is a number of from 0 to 2 and when $c$ is equal to 0, then at least one Z must be OR''''.

Among the hydrocarbon radicals which R represents are alkyl radicals having from one to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., phenyl, naphthyl and the like; aralkyl radicals, e.g., benzyl, phenylethyl, phenylpropyl, phenylbutyl and the like; alkaryl radicals, e.g., tolyl, xylyl, ethylphenyl and the like; R' is a hydrocarbon radical selected from the class consisting of alkyl radicals, e.g., methyl, ethyl, butyl, hexyl, octyl, dodecyl, octadecyl; aryl radicals such as phenyl, diphenyl and the like; alkaryl radicals such as tolyl, xylyl, ethylphenyl and the like; aralkyl radicals such as benzyl, phenylethyl and the like; haloaryl radicals such as chlorophenyl, tetrachlorophenyl, difluorophenyl and the like. In addition R' represents cyano substituted lower alkyl radicals having up to about four alkyl carbon atoms such as cyanomethyl, alpha-cyanoethyl, beta-cyanoethyl, beta-cyanopropyl, gamma cyanopropyl and cyano substituted mononuclear aryl radicals such as cyanophenyl and the like; R'' is an alkylene radical such as ethylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals containing an oxygen atom. Other radicals represented by R'' are vinylene, propenylene, butenylene and the like. Monovalent hydrocarbon radicals represented by R'''' are alkyl radicals having from one to 12 carbon atoms, e.g., methyl, ethyl, propyl, butyl, octyl, decyl, dodecyl and the like and aryl radicals, such as, phenyl, naphthyl and the like.

These acrylate or substituted acrylate-functional siloxanes are prepared by reacting silanes or siloxanes having an acrylate or substituted acrylate-functional group with an organopolysiloxane and thereafter equilibrating the reaction mixture in the presence of a base catalyst and an aprotic solvent. More specifically the acrylate-functional silanes having the general formula

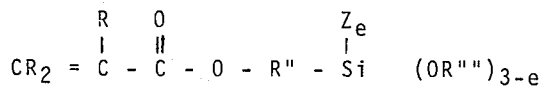

or the corresponding siloxanes of the general formula

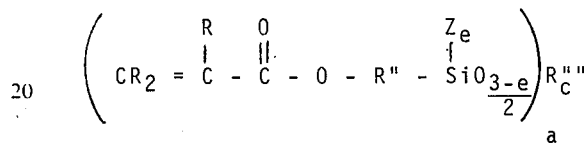

in which R, R'', R'''', Z, $a$, $c$ and $e$ are the same as defined above, are mixed with organopolysiloxanes, preferably cyclic organopolysiloxanes, and thereafter equilibrated in the presence of a base catalyst and an aprotic solvent. The resulting acrylate or substituted acrylate-functional polysiloxane polymers may have a ratio of acrylate to siloxane units (R'$_2$SiO) of from 1 to 20,000 to 20,000 to 1.

The acrylate-functional silanes or siloxanes used in the equilibration reaction may be prepared by the addition of a compound of the formula

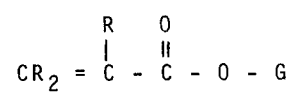

where G is an unsaturated radical such as vinyl, allyl, methallyl or butenyl with a compound of the formula

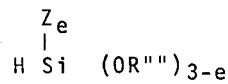

in which R, R'''', Z and e are the same as above. These addition reactions are best carried out of the temperatures from about 50° to 120°C. in the presence of a platinum catalyst such as platinum deposited on alumina and chloroplatinic acid.

The above reaction may be illustrated by the following equation:

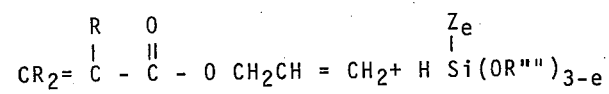

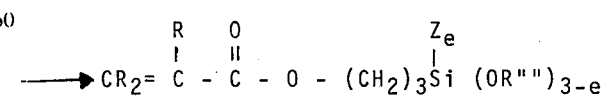

Another method for preparing the acrylate-functional silanes involves reacting a chloroalkylsilane of the formula

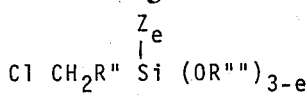

with a tertiary amine salt of acrylic acid or a substituted acrylic acid. The amine, preferably triethylamine, and the acrylic acid or methacrylic acid can be mixed and the chloroalkylsilane added to the mixture in approximately stoichiometric quantities. Preferably the reaction is carried out in the presence of an inert organic solvent such as benzene, toluene, xylene or cyclohexane, at reaction temperatures of from 100° to about 175°C. It is best to conduct the reaction in the presence of one or more polymerization inhibitors for acrylic acid or methacrylic acid, such as hydroquinone and N,N'-diphenylphenylene diamine. The reaction proceeds with the formation of the desired product

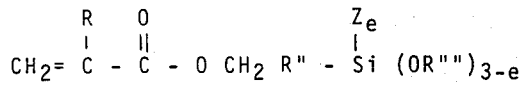

in which R, R", R"", Z and e are the same as above, and the precipitation of the by-product tertiary amine hydrochloride.

The corresponding siloxanes may also be prepared by the methods described hereinabove.

Any acrylic acid or substituted acrylic acid can be employed in preparing the acrylate-functional silanes and siloxanes of this invention. Thus, for example acrylic acid and methacrylic acid and substituted acrylic and methacrylic acid may be employed.

Specific examples of acrylate-functional silanes which may be equilibrated with the organopolysiloxanes are r-methacrylatopropyltrimethoxysilane, r-acrylatopropyltriethoxysilane, r-methacrylatohexyltrimethoxysilane, r-acrylatoheptylmethyldimethoxysilane, r-methacrylatobutylmethyldimethoxysilane, r-acrylatopropylmethyldimethoxysilane, etc. Examples of suitable acrylate-functional siloxanes are the corresponding siloxanes obtained from the hydrolysis of the aforementioned silanes. The acrylate-functional siloxanes which contain the trimethylsiloxy units are obtained from the cohydrolysis of the aforementioned silanes and triorganohydrocarbonoxysilanes of the formula R'₃SiOR'''', in which R'''' is the same as defined above. Suitable examples of triorganohydrocarbonoxysilanes are trimethylmethoxysilane, triethylethoxysilane, trimethoxyethoxysilane, tributylethoxysilane, tributylpropoxysilane, tripropylmethoxysilane, trimethylbutoxysilane, trihexylmethoxysilane, trioctylmethoxysilane, trioctylbutoxysilane and the like.

Cyclic siloxanes are the preferred starting materials for the preparation of the organopolysiloxane polymers of this invention. These cyclic polysiloxanes may be represented by the formula

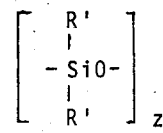

wherein $z$ is a number of from 3 to 8. These organopolysiloxanes can be hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Generally, it is preferred that an organocyclotrisiloxane be employed instead of the organocyclotetrasiloxane because the rate of equilibration of the cyclotetrasiloxane is considerably slower than that of the organocyclotrisiloxane. Other siloxane polymers which may be employed are hydroxyl-terminated organopolysiloxanes, triorganosiloxy end-blocked organopolysiloxanes and trihydrocarbonoxy end-blocked organopolysiloxanes in which the organo groups may contain from one to 18 carbon atoms.

Although certain acids such as hydrochloric acid, sulfuric acid and ferric chloride have been used as catalysts in the preparation of organopolysiloxane polymers, it is preferred that an alkali metal compound be employed as the catalyst.

Examples of suitable compounds are lithium alkoxide, lithium methoxide, lithium butoxide; lithium alkyls, e.g., ethyl lithium, isopropyl lithium, n-butyl lithium, vinyl lithium and the like; lithium aryls such as phenyl lithium and the like; lithium hydride, lithium aluminum hydride, lithium silanoate and lithium hydroxide.

Heretofore, various catalysts, particularly lithium compounds have been used in the polymerization of organocyclotrisiloxanes to control such properties as molecular weight and viscosity. In the practice of this invention the lithium catalysts do not control the molecular weight of the polymer. Instead the ratio of alkoxy groups to siloxane (R'₂SiO) units control the molecular weight of the resulting polymer. Although it is not the intent of this invention to be bound by any particular theory, it is believed that the following mechanism is involved in this invention. For example, gamma-methacrylatopropyltrimethoxysilane and hexamethylcyclotrisiloxane are hexamethylcyclotrisiloxane in the presence of n-butyl lithium in accordance with the following equations.

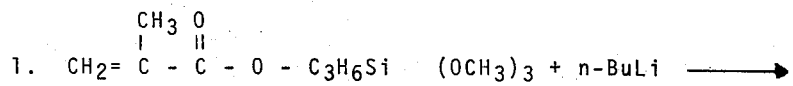

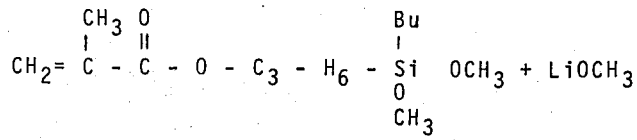

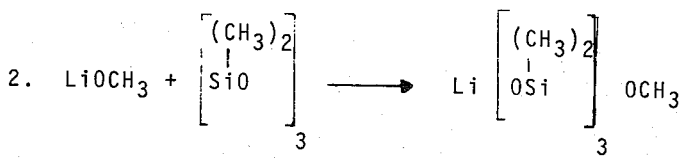

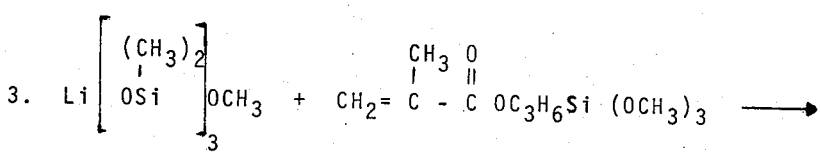

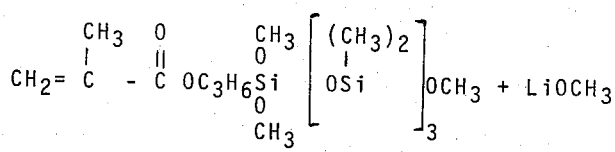

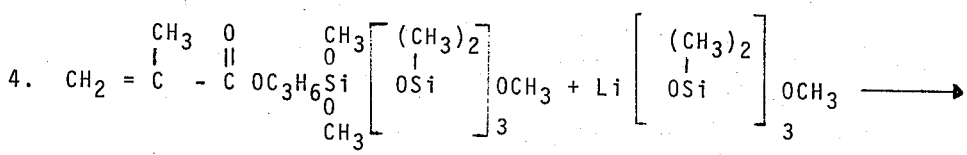

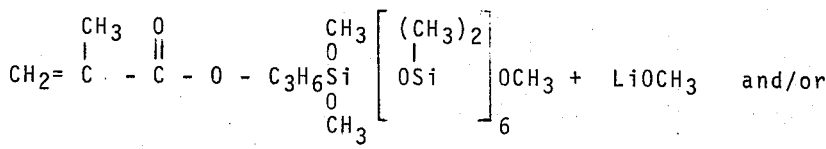

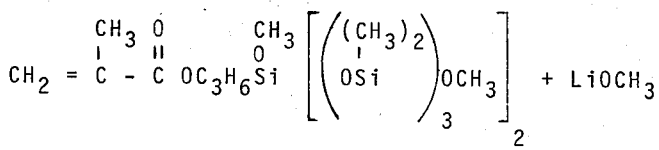

Reactions which occur in Equations 2 and 4 are repeated until all the hexamethylcyclotrisiloxane has been consumed. The mechanism shown is simplified for purposes of illustration; however, the lithium methoxide in Equation 2 could react with several moles of hexamethylcyclotrisiloxane before reacting with the acrylate-functional silane of Equation 3 or the acrylate-functional siloxane of Equation 4. It can be seen from Equation 1 that the mole ratio of n-butyl lithium catalyst to acrylate-functional silicon compound is very important as it determines the number of reactive sites for propagation of the polymer.

When other catalysts such as lithium alkoxide, lithium hydroxide, lithium silanoate or lithium hydride are employed, the number of reactive sites for propagation of the polymer are not effected by the catalyst level.

Although the lithium type catalysts are preferred, other catalysts such as alkali metal hydroxides, e.g., sodium hydroxide and potassium hydroxide and organic compounds of alkali metals, e.g., sodium alkyls and aryls, potassium alkyls and aryls may be used in the equilibration of the organopolysiloxane and the acrylate-functional silanes and/or siloxanes. Examples of suitable alkali metal alkyls are ethyl sodium, triphenylmethyl sodium and the like.

The amounts of catalyst is not critical, however, it is preferred that from 0.00001 mole percent to 1.0 mole percent of catalyst be employed to effect the equilibration and that the mole ratio of catalyst to alkoxy groups present in the acrylate-functional silane or siloxanes does not exceed about 1 to 12. However, it is recognized that greater amounts may be used but it is the intent of the invention to provide a catalyst system which does not react with the reactive acrylate group or the ester linkage and the lower lithium catalyst levels have been found to be best suited for this purpose.

Generally, it is desirable to remove or destroy the catalysts after the equilibration because their presence will adversely affect the properties of the resulting polymer. The base catalysts for example may be removed by washing with water. Also, the base catalysts may be destroyed by neutralizing them with acid reagents, i.e., when a base is used as a catalyst, it may be neutralized by the addition of an acid. More specifically, the lithium type catalysts may be effectively neutralized by the addition of an organic acid, such as acetic acid.

In general the reaction of the cyclosiloxanes with the acrylate-functional silane or siloxane can be carried out at temperatures ranging from about 25°C. and up to about 150°C. or higher for times varying from a few minutes to several hours. Although, it is not essential, it is preferred that the equilibration be conducted in the presence of an inert atmosphere.

The term "aprotic solvent" is intended to mean any organic solvent that is free of active protons which will interfere with growing anionic polymerization centers. These may include such solvents as various tertiary amines, such as, triethylamine, tributylamine, pyridine and the like; other suitable solvents are dimethyl sulfoxide, dioxane, alkyl ethers; glycols, such as diethylene glycol diethyl ether, diethylene glycol dimethyl ether, diethoxyethane, tetrahydrofuran and mixtures thereof. The use of mixtures of solvents having different boiling points permits this invention to be practiced at variable temperatures. However, it is preferred that certain special dipolar aprotic solvents having electron donating centers be employed. These solvents are chosen such that their electron-donating centers are capable of forming coordinated complexes with the lithium cation, thereby coordinating with the lithium and enhancing its reactivity by virtue of such coordination.

Certain other hydrocarbon solvents which do not coordinate with the lithium cation can be employed with the aprotic solvents described above to provide more intimate contact between the reactants. Examples of suitable solvents are aliphatic hydrocarbons such as hexane, heptane, octane and aromatic hydrocarbons such as benzene, toluene, xylene and the like. It is preferred in the practice of this invention that from 0.05 to about 10 percent of the aprotic solvent have a Lewis base characteristic and the remainder of the solvent employed may be selected from the hydrocarbon aprotic solvents.

The acrylate-functional siloxane polymers of this invention may be used as intermediates in the preparation of copolymers containing organopolysiloxane segments which may be used in the formation of various coating compositions. In addition, these acrylate-functional siloxane polymers may be used as sizing agents and as protective coatings for paper and fabrics.

Various embodiments of this invention are illustrated in the following examples in which all parts are by weight unless otherwise specified.

EXAMPLE 1

About 0.2 part of n-butyl lithium was added with agitation to a reaction vessel containing 111 parts of hexamethylcyclotrisiloxane, 100 parts of benzene, 11 parts of ethylene glycol dimethylether and 12.4 parts r-methacrylatopropyltrimethoxysilane. The reaction mixture was heated to reflux temperature and maintained at this temperature for about 2.5 hours. The catalyst was neutralized by the addition of 0.21 part of acetic acid and the reaction product filtered. The solvent was removed at 130°C. at 2 mm Hg over a period of about 4 hours. A fluid product having a viscosity of about 66 cs. at 25°C. was recovered. Nuclear magnetic resonance analysis of the product showed the following groups to be present in the indicated mole ratio:

| Groups | Actual | Theoretical |
|---|---|---|
| $-CH_2=C$ | 1 | 1 |
| $-CH_2OC\overset{O}{\overset{\|}{}}$ | 0.9 | 1 |
| $CH_3O-$ | 2.8 | 3.0 |
| $OSi(CH_3)_2$ | 32.8 | 30.0 |

The resulting polymer had the average general formula

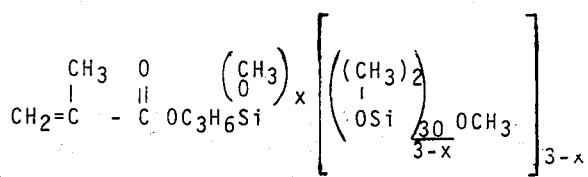

wherein $x$ is a number of from 0 to 2.

EXAMPLE 2

In a comparison example, the procedure of Example 1 was repeated except that r-methacrylatopropyltrimethoxysilane was omitted. The resulting product was a fluid having a viscosity of about 2,200 cs. at 25°C.

These example shown that r-methacrylatopropyltrimethoxysilane controls the molecular weight of the polymer.

EXAMPLE 3

The procedure of Example 1 was repeated except that the reaction mixture was refluxed for 8.5 hours in the absence of ethylene glycol dimethyl ether. The volatiles were stripped from the reaction product and analyzed by gas chromatography. Analysis of the volatiles showed that about 52 weight percent of the initial hexamethylcyclotrisiloxane had not polymerized. About 75.8 parts of fluid product was obtained. Nuclear magnetic resonance analysis of the product showed the following groups to be present in the indicated mole ratio:

| Groups | Found | Calculated |
|---|---|---|
| $-CH_2=C$ | .75 | 1 |
| $-CH_2O\overset{O}{\overset{\|}{C}}$ | .68 | 1 |
| $-OCH_3$ | 3.0 | 3 |
| $-OSi(CH_3)_2$ | 16.5 | 15.6 |

Furthermore, the analysis showed that about 25 percent of the acrylate-functionality had polymerized. This Example shows the adverse affect of omitting the aprotic solvent, i.e., a longer reaction time is required to achieve complete conversion of the organopolysiloxane. In addition this Example shows that long reaction times adversely affect the acrylate-functionality.

EXAMPLE 4

Example 1 was repeated except that 111 parts of octamethylcyclotetrasiloxane ($D_4$) was substituted for the hexamethylcyclotrisiloxane ($D_3$) and the reaction mixture was refluxed for 8.5 hours. Analysis of the resulting product showed that about 11 percent of the $D_4$ polymerized.

EXAMPLE 5

The procedure of Example 1 was repeated except that 133.2 parts of hexamethylcyclotrisiloxane, 13.3 parts of ethylene glycol dimethyl ether, 119.9 parts of benzene, 24.3 parts of r-methacrylatopropyltrimethoxysilane, and 0.064 part of n-butyl lithium were employed. A fluid having a viscosity of 23 cs. at 25 °C. was obtained, which by nuclear magnetic resonance analysis showed the following groups to be present:

| Groups | Found | Calculated |
|---|---|---|
| $-CH_2=C$ | 0.4 | 0.3 |
| $-CH_2O\overset{O}{\underset{\|\|}{C}}$ | 0.4 | 0.3 |
| $CH_3O-$ | 1 | 1 |
| $-OSi(CH_3)_2$ | 5.7 | 6 |

EXAMPLE 6

The procedure described in Example 1 was repeated except that 0.02 percent by weight of p-methoxyphenol based on the weight of polymer was added as inhibitor after the catalyst had been neutralized with acetic acid and the lithium acetate had been removed by filtration. A fluid product having a viscosity of about 50 cs. at 25°C. was obtained which by nuclear magnetic resonance analysis indicated that the following groups were present:

| Groups | Mole Ratio | Theoretical |
|---|---|---|
| $-CH_2=C$ | 1 | 1 |
| $-CH_2O\overset{O}{\underset{\|\|}{C}}-$ | 1.2 | 1.0 |
| $-OCH_3$ | 3 | 3.0 |
| $-OSi(CH_3)_2$ | 32 | 30 |

EXAMPLE 7

To a reactor containing about 24 parts of r-methacrylatopropyltrimethoxysilane, 0.3 part of lithium hydroxide and 248 parts of methanol was added about 16.2 parts of distilled water over a period of about 30 minutes. The contents of the reactor were heated to reflux temperature and refluxed for about 3 hours. The volatiles were removed at a temperature of about 125°C. (3 mm Hg) over a period of about 4 hours. A sample of the resulting reaction product was analyzed by N.M.R.

| Groups | Mole Ratio |
|---|---|
| $CH_3O-$ | 1.17 |
| $CH_2=\overset{CH_3}{\underset{\|}{C}}-\overset{O}{\underset{\|\|}{C}}-$ | .98 |
| $-OC_3H_6Si\equiv$ | 1.0 |

About 155.4 parts of hexamethylcyclotrisiloxane, 30.0 parts of tetrahydrofuran, and 120 parts of benzene were added to the reactor containing the reaction product. The reactants were heated to reflux temperature and maintained at this temperature for about 2.5 hours. About 0.12 part of glacial acetic acid was then added and the volatiles were removed under vacuum (2 mm Hg) for about 4 hours at 100°C. The product had a viscosity of 125 cs. at 25°C. Analysis by N.M.R. showed the following groups to be present.

| Groups | Mole Ratio |
|---|---|
| $CH_3O-$ | 1.17 |
| $CH_2=\overset{CH_3}{\underset{\|}{C}}-\overset{O}{\underset{\|\|}{C}}-$ | 0.98 |
| $OC_3H_6Si\equiv$ | 1.0 |
| $\equiv Si(CH_3)_2$ | 2.05 |

EXAMPLE 8

Polyacrylate-functional dimethylpolysiloxanes containing trialkylsiloxy units were prepared in accordance with the procedure described in Example 1 except that 30.7 parts of water were mixed with 298 parts of methanol and added to a reactor containing 0.3 part of lithium hydroxide, 104 parts of trimethylmethoxysilane and 248 parts of r-methacrylatopropyltrimethoxysilane. Analysis of the reaction product by N.M.R. showed the following groups to be present in the mole ratio indicated.

| Groups | Mole Ratio |
|---|---|
| $CH_3Si\equiv$ | 2.9 |
| $CH_3O-$ | 0.7 |
| $\equiv Si\ C_3H_6O-$ | 1 |
| $CH_2=\overset{CH_3}{\underset{\|}{C}}-\overset{O}{\underset{\|\|}{C}}-$ | 1 |

About 1,221 parts of hexamethylcyclotrisiloxane, 1,020 parts of benzene and 200 parts of tetrahydrofuran were added to the above product and reacted in accordance with the procedure described in Example 7. The resulting product had a viscosity of 90 cs. at 25°C. Analysis of the resulting product by N.M.R. showed the following groups to be present.

| Groups | Mole Ratio |
|---|---|
| $CH_3Si\equiv$ | 36.0 |
| $CH_3O-$ | 0.7 |
| $\equiv Si\ C_3H_6O-$ | 1 |
| $CH_2=\overset{CH_3}{\underset{\|}{C}}-\overset{O}{\underset{\|\|}{C}}-$ | 1 |

When the above Examples were repeated utilizing other aprotic solvents, acrylate-functional polysiloxane polymers were obtained which are substantially the same as those of the specific examples. Also, when other organopolysiloxanes were substituted for the hexamethylcyclotrisiloxanes in these Examples, similar polysiloxane polymers were obtained.

Although specific examples of the invention have been described herein, it is not intended to limit the invention solely thereto but to include all variations and modifications falling within the spirit and scope of the appended claims.

What is claimed is:

1. Polysiloxane polymers of the general formula

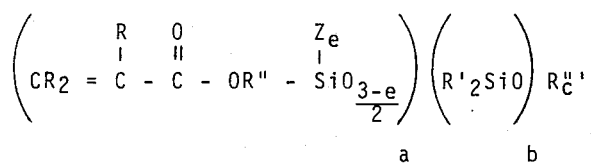

in which R is selected from the group consisting of hydrogen and monovalent hydrocarbon radicals having from one to 12 carbon atoms, R' is selected from the group consisting of monovalent hydrocarbon radicals, halogenated monovalent hydrocarbon radicals or cyanoalkyl radicals having from one to 18 carbon atoms, R'' is selected from the group consisting of a divalent hydrocarbon radical having from two to 18 carbon atoms, and the corresponding divalent hydrocarbon radical containing C — O — C linkages, R''' is a radical selected from the group consisting of R''''$O_{0.5}$, R' Si-$O_{0.5}$, Z is a group selected from the class consisting of OR'''', R'''' or OSiR'$_3$ in which R'''' is selected from the group consisting of hydrogen and monovalent hydrocarbon radicals, $a$ and $b$ are each numbers of from 1 to 20,000, C is a number of from 0 to 3 and $e$ is a number of from 0 to 2 and when $c$ is equal to 0, then at least one Z must be OR'''', said polysiloxane polymers are obtained by equilibrating a mixture containing a silicon compound selected from the class consisting of silanes and siloxanes having acrylate and substituted acrylate-functional groups connected thereto and a cyclic organopolysiloxane in the presence of a base catalyst and an aprotic solvent.

2. The composition of claim 1 wherein R is a methyl radical.

3. The compositoin of claim 1 wherein R is hydrogen.

4. The composition of claim 1 wherein R'' is an alkyl radical.

5. The composition of claim 1 wherein R''' is OR'''' and R'''' is selected from the group consisting of hydrogen and monovalent hydrocarbon radicals.

* * * * *

UNITED STATES PATENT AND TRADEMARK OFFICE
CERTIFICATE OF CORRECTION

PATENT NO. : 3,878,263
DATED : April 15, 1975
INVENTOR(S) : Eugene Ray Martin

It is certified that error appears in the above-identified patent and that said Letters Patent are hereby corrected as shown below:

In the claims:

Column 11, line 19 should read:

"selected from the group consisting of $R''''O_{0.5}$, $R'_3Si-$"

Signed and Sealed this

Twenty-ninth Day of May 1979

[SEAL]

Attest:

RUTH C. MASON
Attesting Officer

DONALD W. BANNER
Commissioner of Patents and Trademarks